Nov. 15, 1966  E. M. TUCKER, JR  3,285,675
ENDLESS TRACK UNIT
Filed Nov. 30, 1964
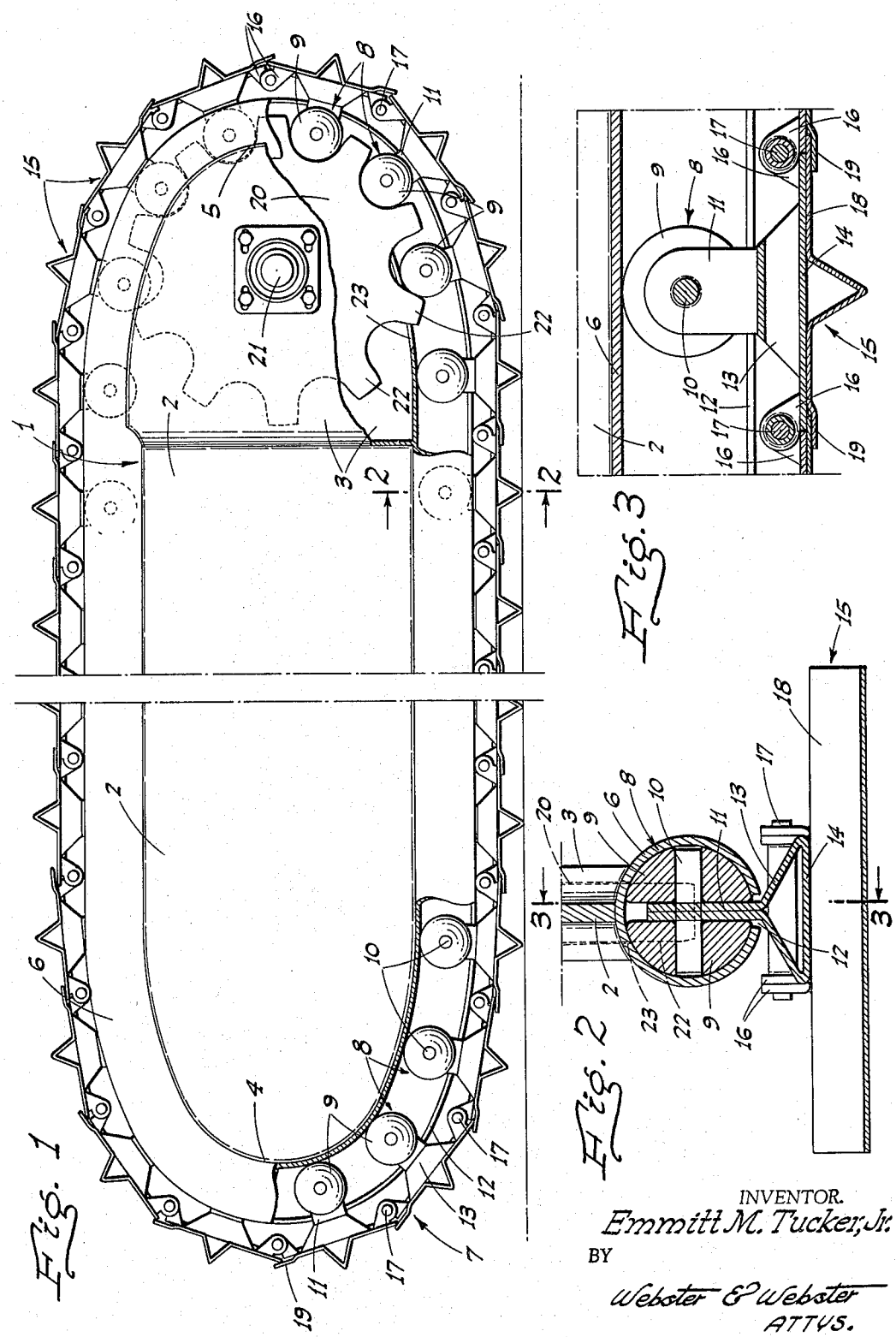
INVENTOR.
*Emmitt M. Tucker, Jr.*
BY
*Webster & Webster*
ATTYS.

United States Patent Office 3,285,675
Patented Nov. 15, 1966

3,285,675
ENDLESS TRACK UNIT
Emmitt M. Tucker, Jr., P.O. Box 431, Ashland, Oreg.
Filed Nov. 30, 1964, Ser. No. 414,765
1 Claim. (Cl. 305—18)

This invention relates to endless track units such as are used on vehicles of various kinds, and especially those which must operate over soft or uneven terrain, such as snow, plowed or debris covered ground, or the like.

The major object of this invention is to provide an improved endless track unit which is principally characterized as to novelty by the inclusion of an exceptionally simple and effective endless track supporting and guiding structure.

An additional object of the invention is to provide an endless track unit, as above, in which the endless track supporting and guiding structure is arranged so that included movable roller members thereof are substantially enclosed in a manner to prevent stones or similar debris from gaining access to and possibly damaging such roller members as the endless track unit moves along the ground.

A further object of the invention is to construct the supporting and guiding structure, of the endless track unit, so that said structure may be used singly on a narrow supporting frame or body or dual and transversely spaced on a relatively wide pontoon or similar body, without any change in the form and construction of such structure being necessary.

A further object of the invention is to provide an endless track unit which is designed for ease and economy of manufacture.

A still further object of the invention is to provide a practical, reliable, and durable endless track unit and one which is exceedingly effective for the purpose for which it is designed.

These objects are accomplished by means of such structure and relative arrangement of parts as will fully appear by a perusal of the following specification and claim.

In the drawings:

FIG. 1 is a foreshortened side elevation of the improved endless track unit, partly broken out and in section.

FIG. 2 is an enlarged fragmentary cross section taken on line 2—2 of FIG. 1.

FIG. 3 is a fragmentary enlarged longitudinal section of the unit, taken substantially on line 3—3 of FIG. 2.

Referring now more particularly to the drawings and to the characters of reference marked thereon, the endless track unit comprises a body indicated generally at 1 and as here shown includes a rigid elongated plate 2, and a pair of rigid transversely spaced relatively short plates 3 projecting from and rigid with one end of the plate 1 and forming in effect a straight extension thereof. The opposed outer ends of the plates 2 and 3 are curved between their upper and lower edges as shown at 4 and 5, respectively, in FIG. 1.

The plates 2 and 3 are surrounded by a rigid endless track supporting and guiding tube 6 of interior circular form in section as shown in FIG. 2; such tube being secured to and following the contour of the edges of the plates 2 and 3 throughout their extent. The tube 6 is symmetrically disposed, transversely, relative to the plate 2, and the spaced-apart plates 3 are symmetrically disposed relative to the plate 2; the diameter of the tube being greater than the spacing of the plates 3 so that the edges of the latter abut and are secured to the tube.

The endless track, indicated generally at 7, is supported and guided by a structure—including the tube 6—comprising the following:

A plurality of equally spaced rollers, indicated generally at 8, and each of which consists of a pair of facing substantially semi-spherical roller members 9 spaced apart somewhat and connected together by a horizontal diametral pin 10, run in the tube 6. The two roller members 9 of each roller 8—when so connected—are arranged so as to have a turnable fit in the tube 6.

Depending from between each pair of roller members 9 and mounted on the related pin 10 is a bracket 11. This bracket projects through an outer, endless longitudinal slot 12 in the tube 6. Outwardly of the tube each bracket 11 spreads laterally out for a short distance, as shown at 13, and then terminates in a rigid longitudinally extending plate 14 which forms part of and extends the full length of each link, indicated generally at 15, of the endless track.

At its ends each plate 14 is provided at the sides with ears 16 which project in overlying relation to the adjacent ends of adjacent plates 14, so as to overlap the ears of such adjacent plates; the cooperating pairs of ears being connected by pivot pins 17. Each plate 14 has a cleated ground engaging or traction plate 18 secured thereon; such traction plate being preferably considerably wider than, but symmetrical to, the tube 6 and the plate 14. At one end each plate 18 has an offset lip 19 which laps the adjacent end of the adjacent plate 18.

A sprocket wheel 20 is disposed between the plates 3 with its axial shaft 21 journaled on said plates; the teeth 22 of such wheel projecting through an inner longitudinal slot 23 in the adjacent portion of the tube 6 and engaging the adjacent rollers 8 in succession as the sprocket wheel rotates. The center of curvature of the plate edge 5, and that of the adjacent portion of the tube 6, is coincident with the axis of the sprocket wheel so that a number of the rollers 8 will be simultaneously engaged by the teeth 22. The sprocket wheel 20 is, of course, driven from power means on the chassis of the vehicle on which the body 1 is mounted.

As the mounting of said body on the vehicle chassis, and the drive for the sprocket wheel, are substantially conventional or standard, such features are not here shown.

Further, it is to be recognized that the body of the endless track unit—instead of essentially a single plate form as herein shown—may be of the relatively wide pontoon form as disclosed, for instance, in United States Patent No. 2,561,716. In such pontoon form of the track unit, there would be included a pair of transversely spaced tubes 6 and related parts, with the ground engaging or traction plates 18 extending the full transverse distance therebetween.

Additionally, it may be noted that the endless rubber or rolling envelope type of track shown in my copending United States patent application Serial No. 409,863 may be substituted for the metallic track illustrated in the present application; said rubber track to be connected in a suitable manner to the different tube-enclosed rollers 8.

With the endless track unit constructed as herein described, it will be seen that the track-supporting rollers 8 are substantially enclosed throughout the length of the track, and are thus protected against being possibly damaged or wedged against movement by contact with rocks or other debris. Also, the tube and roller assembly provides a relatively free running and yet properly supported and guided endless track.

From the foregoing description, it will be readily seen that there has been produced such an endless track unit as substantially fulfills the objects of the invention, as set forth herein.

While this specification sets forth in detail the present and preferred construction of the endless track unit, still in practice such deviations from such detail may be resorted to as do not form a departure from the spirit of the invention, as defined by the appended claim.

Having thus described the invention, the following is claimed as new and useful and upon which Letters Patent is desired:

An endless track unit comprising a rigid elongated body having rounded ends, an endless rigid tube extending about and following the contour of the periphery of the body and secured thereto, an endless ground engaging track symmetrically surrounding the tube, and means supporting the track from the tube for movement lengthwise relative thereto; said means including spaced rollers in and substantially fitting the tube, and a bracket supported by and projecting from each roller, the tube having an outer endless longitudinal slot through which the brackets project to connection with the track, the interior of the tube being of circular form in cross section, each roller comprising a pair of oppositely facing substantially semi-spherical members spaced apart in a vertical plane, and an axial horizontal pin connecting said members; the related bracket projecting between said members and being mounted on the pin.

References Cited by the Examiner

UNITED STATES PATENTS

| | | | |
|---|---|---|---|
| 1,153,845 | 9/1915 | Henneuse | 305—17 |
| 1,310,417 | 7/1919 | Johnson | 305—17 |
| 1,400,218 | 12/1921 | Howe | 305—18 |

BENJAMIN HERSH, *Primary Examiner.*

R. J. JOHNSON, *Assistant Examiner.*